(12) United States Patent
Sheridan

(10) Patent No.: US 10,883,425 B2
(45) Date of Patent: Jan. 5, 2021

(54) OIL LOSS PROTECTION FOR A FAN DRIVE GEAR SYSTEM

(71) Applicant: United Technologies Corporation, Farmington, CT (US)

(72) Inventor: William G. Sheridan, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 289 days.

(21) Appl. No.: 15/850,249

(22) Filed: Dec. 21, 2017

(65) Prior Publication Data

US 2018/0195440 A1    Jul. 12, 2018

Related U.S. Application Data

(63) Continuation of application No. 14/635,524, filed on Mar. 2, 2015, now Pat. No. 9,879,608.
(Continued)

(51) Int. Cl.
*F01D 25/18* (2006.01)
*F02C 7/36* (2006.01)
(Continued)

(52) U.S. Cl.
CPC ............... *F02C 7/36* (2013.01); *F01D 25/18* (2013.01); *F02C 3/04* (2013.01); *F02C 7/06* (2013.01);
(Continued)

(58) Field of Classification Search
CPC ...... F02C 7/36; F02C 7/06; F02C 7/16; F01D 25/18; F16H 1/36; F16H 57/0427;
(Continued)

(56) References Cited

U.S. PATENT DOCUMENTS 2,652,296 A    9/1953 Palmgren et al.
2,936,655 A    5/1960 Peterson et al.
(Continued)

FOREIGN PATENT DOCUMENTS

DE    102010032252    1/2012
EP    1703174    9/2006
(Continued)

OTHER PUBLICATIONS

The Extended European Search Report for EP Application No. 17173449.4, dated Nov. 3, 2017.
(Continued)

*Primary Examiner* — J. Todd Newton
*Assistant Examiner* — Sabbir Hasan
(74) *Attorney, Agent, or Firm* — Carlson, Gaskey & Olds, P.C.

(57) ABSTRACT

A fan drive gear system includes at least one intermediate gear that includes an axial gear passage for receiving and conveying a fluid suitable for cooling and/or lubricating. At least a first axial end of the intermediate gear includes a first fluid storage trap for capturing fluid entering and/or exiting the gear passage and storing the fluid therein during powered operation of the fan drive gear system. The fluid is capable of being passively supplied to the intermediate gear passage during an interrupted power event.

11 Claims, 3 Drawing Sheets

Related U.S. Application Data

(60) Provisional application No. 61/954,039, filed on Mar. 17, 2014.

(51) Int. Cl.

| | | |
|---|---|---|
| *F02C 7/06* | (2006.01) | |
| *F16H 57/04* | (2010.01) | |
| *F16H 57/08* | (2006.01) | |
| *F02C 3/04* | (2006.01) | |
| *F02C 7/16* | (2006.01) | |
| *F16H 1/36* | (2006.01) | |

(52) U.S. Cl.
CPC ................ *F02C 7/16* (2013.01); *F16H 1/36* (2013.01); *F16H 57/043* (2013.01); *F16H 57/0427* (2013.01); *F16H 57/0442* (2013.01); *F16H 57/0456* (2013.01); *F16H 57/0479* (2013.01); *F16H 57/0486* (2013.01); *F16H 57/082* (2013.01); *F05D 2220/32* (2013.01); *F05D 2240/35* (2013.01); *F05D 2260/20* (2013.01); *F05D 2260/40311* (2013.01); *F05D 2260/53* (2013.01); *F05D 2260/98* (2013.01)

(58) Field of Classification Search
CPC ............. F16H 57/0442; F16H 57/0456; F16H 57/0479; F16H 57/0486; F16H 57/82; F05D 2220/32; F05D 2240/35; F05D 2260/20; F05D 2260/40311; F05D 2260/53; F05D 2260/98
See application file for complete search history.

(56) References Cited

U.S. PATENT DOCUMENTS

| | | |
|---|---|---|
| 3,021,731 A | 2/1962 | Stoeckicht |
| 4,086,759 A | 5/1978 | Karstensen et al. |
| 5,102,379 A | 4/1992 | Pagluica et al. |
| 5,466,198 A | 11/1995 | McKibbin et al. |
| 6,223,616 B1 | 5/2001 | Sheridan |
| 6,602,158 B2 | 8/2003 | Wildeshaus |
| 8,167,554 B2 | 5/2012 | Wang et al. |
| 8,246,503 B2 | 8/2012 | Shreidan et al. |
| 8,267,826 B2 * | 9/2012 | Duong ................. F16H 57/042 475/159 |
| 8,845,277 B2 | 9/2014 | Davis |
| 8,870,124 B2 | 10/2014 | Ireland |
| 9,359,957 B2 | 6/2016 | Makulec et al. |
| 9,429,225 B2 * | 8/2016 | Feraud ............... F16H 57/0442 |
| 2005/0043136 A1 | 2/2005 | Colter et al. |
| 2006/0022366 A1 | 2/2006 | Iwamoto et al. |
| 2006/0252596 A1 | 11/2006 | Abarquez et al. |
| 2009/0247348 A1 | 10/2009 | Haupt et al. |
| 2010/0317477 A1 | 12/2010 | Sheridan et al. |
| 2010/0317478 A1 | 12/2010 | McCune et al. |
| 2010/0331139 A1 | 12/2010 | McCune |
| 2011/0008174 A1 | 1/2011 | Ireland |
| 2011/0203284 A1 | 8/2011 | Ritland et al. |
| 2011/0223033 A1 | 9/2011 | Wang et al. |
| 2011/0286836 A1 | 11/2011 | Davis |
| 2013/0000323 A1 | 1/2013 | Kupratis |
| 2013/0048091 A1 | 2/2013 | DiBenedetto et al. |
| 2013/0051975 A1 | 2/2013 | Makulec et al. |
| 2013/0091863 A1 | 4/2013 | Makulec et al. |
| 2013/0269479 A1 * | 10/2013 | van der Merwe .... F16H 57/025 74/606 R |
| 2016/0377165 A1 | 12/2016 | Sheridan |

FOREIGN PATENT DOCUMENTS

| | | |
|---|---|---|
| FR | 2995055 | 3/2014 |
| WO | 2013155260 | 10/2013 |

OTHER PUBLICATIONS

Extended European Search Report for Application No. 15158519.7 dated Sep. 15, 2015.

* cited by examiner

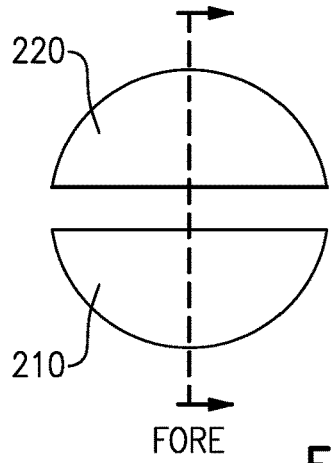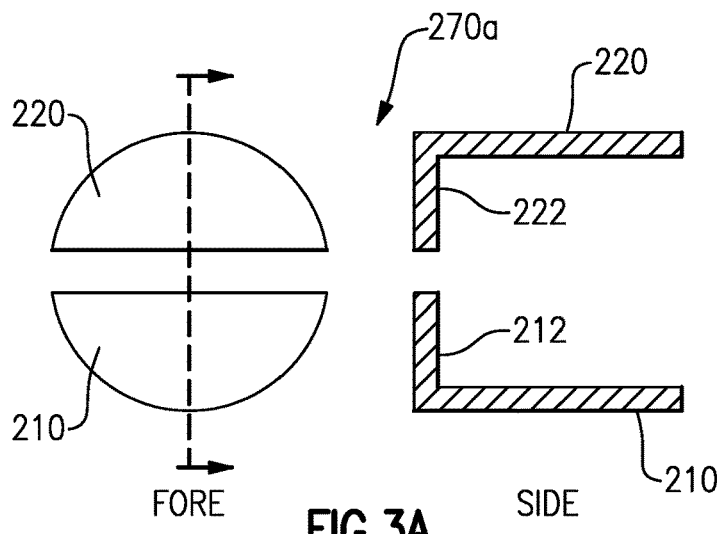

OIL LOSS PROTECTION FOR A FAN DRIVE GEAR SYSTEM

CROSS-REFERENCE TO RELATED APPLICATION

This application is a continuation of U.S. patent application Ser. No. 14/635,524 filed on Mar. 2, 2015. Application Ser. No. 14/635,524 claims priority to U.S. Provisional Application No. 61/954,039 filed on Mar. 17, 2014.

TECHNICAL FIELD

The present disclosure relates generally to fan drive gear systems, and more specifically to an oil loss prevention apparatus for the same.

BACKGROUND

Gas turbine engines, such as those utilized in commercial aircraft, frequently utilize a geared turbofan engine. In a typical geared turbofan engine, a forward fan is connected to a central shaft via a gearing system. The gearing system allows multiple components of the turbine engine to be rotated at different speeds off of the same shaft.

One type of commonly used gear system is referred to as an epicyclic gear system. An epicyclic gear system has one or more outer gears (intermediate gears), revolving about a central gear (sun gear). Typically, the intermediate gears are mounted on a carrier which itself may rotate relative to the sun gear. Epicyclic gear systems also typically incorporate the use of an outer ring gear, which meshes with the intermediate gears.

In one example, the carrier is fixed from rotation about the sun gear and this is referred to as a Star system. The intermediate gears are referred to as star gears and rotate about a fixed axis in the carrier and cause the ring gear to rotate in the opposite direction as the sun gear.

In another example, the ring gear is fixed and the carrier and intermediate gears are allowed to rotate about the sun gear. This type of gear system is referred to as a Planetary system. The intermediate gears are referred to as planet gears. In this example the carrier rotates in the same direction as the sun gear.

During operation of the planetary gear system a lubricant/coolant fluid, such as oil is provided to the internal components of the planetary gear system. The lubricant/cooling fluid cools the components and prevents wear/seizing of the gear system.

SUMMARY OF THE INVENTION

A fan drive gear system according to an exemplary embodiment of this disclosure, among other possible things includes at least one intermediate gear that includes an axial gear passage for receiving and conveying a fluid suitable for cooling and/or lubricating, and at least a first axial end of the planetary gear includes a first fluid storage trap for capturing fluid entering and/or exiting the gear passage and storing the fluid therein during powered operation of the fan drive gear system, whereby the fluid is capable of being passively supplied to the planet gear passage during an interrupted power event.

In a further embodiment of the foregoing fan drive gear system, a sun gear interfaced with the intermediate gear, a ring gear interfaced with the intermediate gear, and a carrier body supporting the intermediate gear.

A further embodiment of the foregoing fan drive gear system includes, the at least one fluid trap includes a radially outward base portion relative to an axis defined by the carrier body and at least one radially inward base portion relative to the axis defined by the carrier body.

In a further embodiment of the foregoing fan drive gear system, the radially outward base portion is defined on a first axial end by a radially aligned wall segment of the carrier body relative to the axis defined by the carrier body and the radially outward base portion is defined on a second axial end by a radially aligned wall of the trap.

In a further embodiment of the foregoing fan drive gear system, the radially aligned wall of the fluid storage trap extends further radially away from the axis defined by the carrier body than the radially aligned wall segment.

In a further embodiment of the foregoing fan drive gear system, the at least one intermediate gear includes an axially aligned through hole having an opening at a first end and an opening at a second end opposite the first end, and the radially aligned wall segment of the carrier body extends to an edge of the opening such that excess fluid in the trap spills from the fluid storage trap into the intermediate gear.

In a further embodiment of the foregoing fan drive gear system, the at least one fluid storage trap includes a first fluid storage trap disposed on a first axial end of the intermediate gear and a second fluid storage trap disposed at a second end of the intermediate gear.

In a further embodiment of the foregoing fan drive gear system, the at least one fluid storage trap is a passive element.

In a further embodiment of the foregoing fan drive gear system, the at least one fluid storage trap is affixed to the carrier body via at least one of a seal element and a bond such that a lubricant does not leak between the fluid storage trap and the carrier body.

In a further embodiment of the foregoing fan drive gear system, the fluid storage trap is affixed to the carrier body via at least a bond, and the bond is at least one of a welded bond and an adhesive bond.

In a further embodiment of the foregoing fan drive gear system, the intermediate gear includes an axially aligned bore receiving a pin, at least one roller bearing disposed between a radially outer surface of the pin and a radially outer surface of the intermediate gear, the pin includes an axially aligned bore defining a radially inner pin surface, and the pin includes at least one through hole connecting the radially inner pin surface to a radially outer pin surface such that a fluid in the through hole is passed to an interior of the carrier body.

A further embodiment of the foregoing fan drive gear system includes a powered fluid injection system disposed adjacent at least one opening of the axially aligned bore such that fluid is injected into an interior of said pin.

A gas turbine engine according to an exemplary embodiment of this disclosure, among other possible things includes a fan, a compressor module downstream of the fan, a combustor downstream of the compressor, a turbine module downstream of the combustor having at least a fan drive turbine that indirectly drives the fan, a fan drive gear system mechanically connecting the fan drive turbine and the fan, and the fan drive gear system includes at least one intermediate gear that includes an axial gear passage for receiving and conveying a fluid suitable for cooling and/or lubricating, and at least a first axial end of the planetary gear includes a first fluid storage trap for capturing fluid entering and/or exiting the gear passage and storing the fluid therein during powered operation of the fan drive gear system, whereby the fluid is capable of being passively supplied to the planet gear passage during an interrupted power event.

In a further embodiment of the foregoing gas turbine engine, the fan drive gear system includes a sun gear interfaced with the intermediate gear, a ring gear interfaced with the intermediate gear, and a carrier body supporting the intermediate gear.

In a further embodiment of the foregoing gas turbine engine, the at least one fluid storage trap is operable to retain a fluid injected into the at least one intermediate gear, and return the fluid to the at least one planetary gear.

In a further embodiment of the foregoing gas turbine engine, the at least one fluid trap includes a first fluid trap disposed on a first axial end of the planetary gear and a second fluid trap disposed at a second end of the planetary gear.

In a further embodiment of the foregoing gas turbine engine, the at least one fluid storage trap is a passive element.

In a further embodiment of the foregoing gas turbine engine, the at least one fluid storage trap is affixed to the carrier body via at least one of a seal element and a bond such that a lubricant does not leak between the fluid storage trap and the carrier body.

In a further embodiment of the foregoing gas turbine engine, the fluid storage trap is affixed to the carrier body via at least a bond, and the bond is at least one of a welded bond and an adhesive bond.

A method for providing fluid to a fan drive gear system during interrupted power according to an exemplary embodiment of this disclosure, among other possible things includes disposing a fluid storage trap adjacent an opening in an intermediate gear, receiving and retaining excess fluid in the fluid storage trap during powered operation of the fan drive gear system, and passively returning the excess fluid to the fluid storage trap during unpowered operation of the fan drive gear system.

The foregoing features and elements may be combined in any combination without exclusivity, unless expressly indicated otherwise.

These and other features of the present invention can be best understood from the following specification and drawings, the following of which is a brief description.

BRIEF DESCRIPTION OF THE DRAWINGS

FIG. 3A illustrates a first example fluid trap.
FIG. 3B illustrates a second example fluid trap.
FIG. 3C schematically illustrates a third example fluid trap.

DETAILED DESCRIPTION OF AN EMBODIMENT

Figure 1:
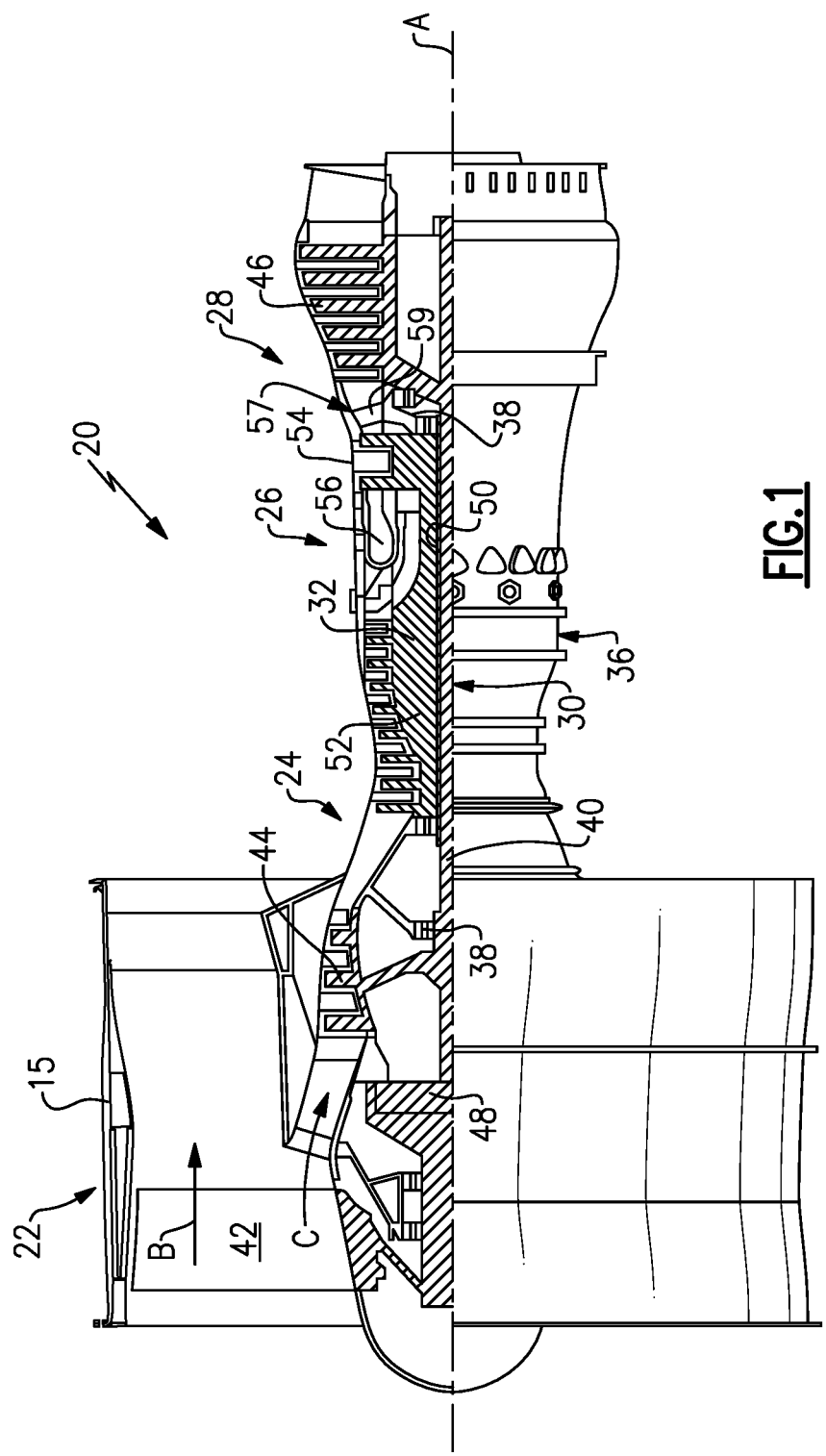
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a gear system 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the gear system 48 is an epicyclic gear train, such as a planetary gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are exemplary of one embodiment, and the present invention is applicable to gas turbine engines having other parameters as well.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 2:
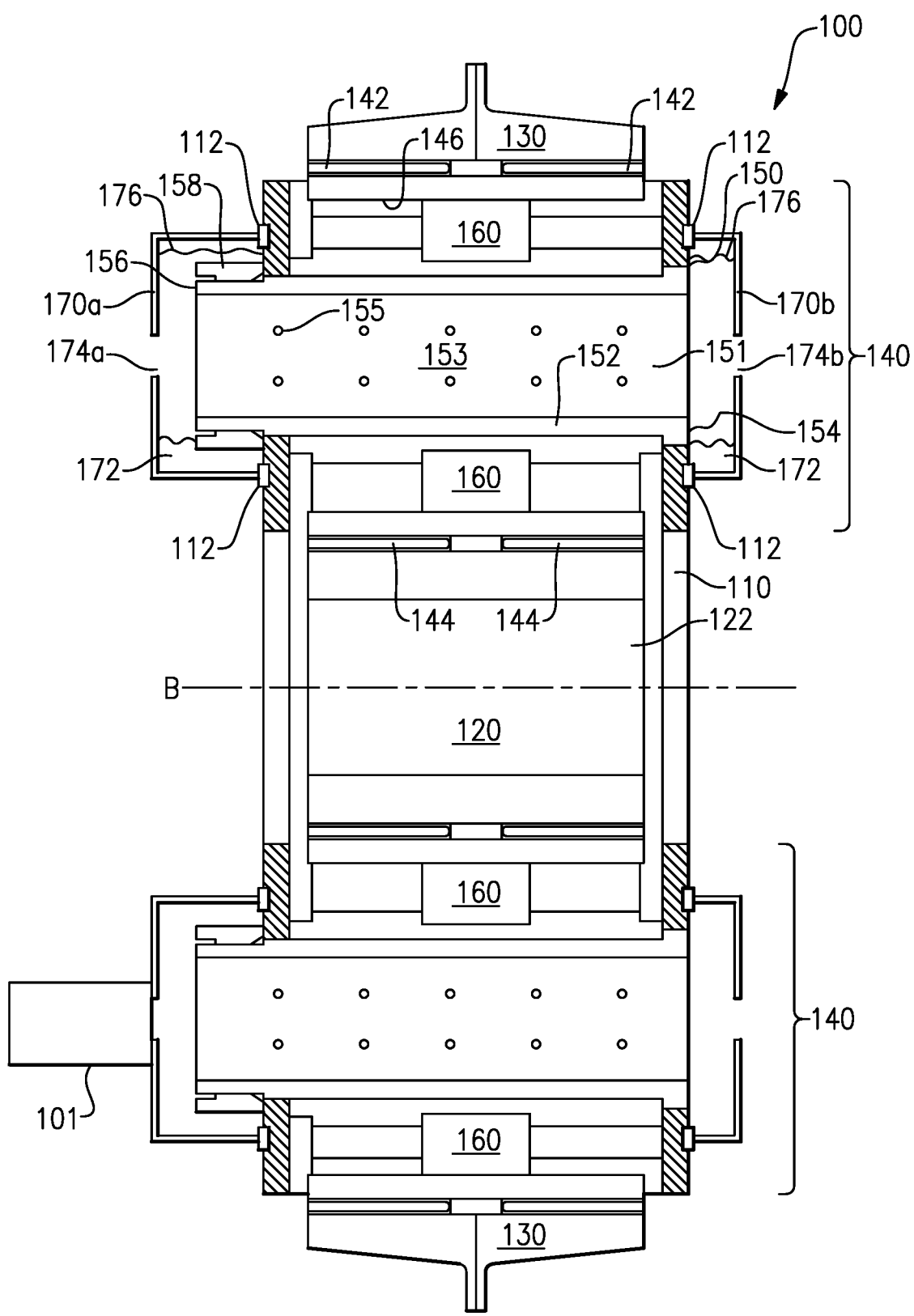
FIG. 2 schematically illustrates a cross sectional view of an epicyclic gearbox.

FIG. 2 schematically illustrates a cross sectional view of an epicyclic gearbox 100, such as could be used for the gear system 48 of FIG. 1. The gearbox 100 includes a carrier 110 that defines a central axis B. A sun gear 120 is centrally disposed in the carrier 110. The sun gear 120 includes a central opening 122 for receiving and interconnecting with an input shaft (not pictured), such as the shaft 40 of FIG. 1. A ring gear 130 is positioned on a radially outward edge of the gearbox 100.

The ring gear 130 is connected to the sun gear 120 via planetary gears 140 at a gear mesh 142 (for the connection to the ring gear 130) and a gear mesh 144 (for the connection to the sun gear 120). The illustrated example of FIG. 2 illustrates two planetary gears 140. In alternate examples, any number of planetary gears 140 can be used depending on the specific needs and requirements of a given gear system, with each of the planetary gears 140 being constructed similarly to the planetary gears 140 described herein.

Each planetary gear 140 includes an axially aligned bore hole 150 through which a pin 152 protrudes. The pin 152 is connected to the carrier 110 on a first axial end 154 and protrudes axially beyond the carrier 110 on a second axial end 156. In the illustrated example, a retaining device 158, such as a threaded fastener, is disposed about the pin 152 at or near the second axial end 156. The retaining device 158 maintains the pin 152 in position within the planetary gear 140. The pin 152 includes an axially aligned through-hole 151 defining an internal axially aligned surface 153 of the pin 152. Disposed across the body of the pin 152 are multiple lubricant/coolant holes 155 that provide a passageway from the through-hole 151 to the interior of the planetary gear 140.

At least one bearing element 160 is disposed between the pin 152 and an inner surface 146 of the planetary gear 140. In the illustrated example of FIG. 2, the bearing element 160 is a roller bearing. In alternate examples the bearing element 160 can be any other suitable bearing type. Disposed on each axial end 154, 156 of the pin 152 is a fluid trap 170.

During operation of the gearbox 100 a lubricant/coolant, such as oil or another fluid, is injected into the pin 152 using a powered lubricant/coolant injector 101. The lubricant/coolant leaks out of the pin 152 through the lubricant/coolant holes 155 disposed on the internal axially aligned surface 153 of the pin 152. As the lubricant/coolant leaks out through the pin 152, the lubricant/coolant is thrown, or sprayed, throughout the gearbox 100 and each of the sun gear 120, the ring gear 130, and the planetary gears 140 are lubricated and cooled. The lubricant/coolant provides one or both of the lubricating and cooling functions, depending on design parameters.

The lubricant/coolant is injected into the pin 152 using a powered injector 101 (illustrated highly schematically) of any known type. During periods of interrupted power, or periods where no power is provided to the powered injector 101, no lubricant/coolant is injected into the pin 152 and no lubricant is provided to the gearbox 100. If the power interruption is too long (exceeds a certain duration), the gearbox 100 can overheat and/or seize causing significant damage to the gearbox 100 and potentially to one or more systems connected to the gearbox 100. To avoid or minimize the damage in the event that the oil system malfunctions during any operational phase, a passive mechanism is provided to temporarily provide the lubricant/coolant fluid to the pin 152 for distribution to the rest of the gearbox 100.

In the illustrated examples, the passive mechanisms are fluid traps 170a, 170b. During operation of the gas turbine engine lubricant/coolant leaks from the pin 152 into base portions 172 of the fluid traps 170a, 170b and pool in that portion. Once sufficient lubricant/coolant has accumulated in the base portions 172 of the fluid traps 170a, 170b, the lubricant/coolant is returned to the through-hole 151 in the pin 152 via spillover. The returned lubricant/coolant is distributed throughout the gearbox 100 in the manner described above. To ensure that the lubricant/coolant spills over into the pin 152, instead of away from the pin through openings 174a, 174b, the openings 174a, 174b are radially centered relative to the axis defined by the pin 152, and the opening 174 in each of the fluid traps 170a, 170b does not extend radially beyond the diameter of the through hole 153 in the pin 152. Thus, when the base portions 172 are full of lubricant/coolant, the lubricant/coolant leaks back into the pin 152 through the through-hole 151.

Each of the fluid traps 170a, 170b are connected to the carrier 110 via a connection feature 112. The connection feature 112 provides a seal against the carrier 110 and prevents accumulated lubricant/coolant from leaking between the fluid traps 170a, 170b and the carrier 110. The sealing feature may be a rubber seal element. Alternatively, the fluid traps 170a, 170b is adhered to the carrier 110 using an adhesion technique, such as bonding or welding, which provides a fluid tight seal.

The above described arrangement allows the gearbox 100 to temporarily continue operating and providing lubricant/coolant to the internal components of the gearbox 100 while no power is being provided to the power system. The wells in the fluid trap 170 may be sized to allow continued operation for a desired operational time frame, with the appropriate size for a given operational time frame being determinable by one of skill in the art.

With continued reference to FIG. 2, FIGS. 3A-3C illustrate example configurations of the fluid traps 170a, 170b of FIG. 2. Each example fluid trap 270a, 270b, 270c is illustrated as a fore view (labeled FORE) and a sectional side view drawn along the corresponding dashed line (labeled SIDE). Each of the fluid traps 270a, 270b, 270c is divided into two portions, a lower portion 210 and an upper portion 220. Each portion 210, 220 combines with an adjacent wall of the carrier 110 to which the fluid traps 270a, 270b, 270c is attached, to form a well region 212, 222 in which excess lubricant/coolant is received and retained until loss of power during which the oil is returned to the pin 152. In practical operations, once the well region 212, 222 has filled to a spillover level, the lubricant/coolant continuously spills over into the pin 152 and is replenished by the new lubricant/coolant being injected into the pin 152.

Furthermore, as can be seen in FIGS. 3A-3C, the fluid traps 270a, 270b, 270c are not limited to any particular geometry. While the illustrated example fluid traps 270a, 270b, 270c have a semicircular face (example 3A), a rectangular face (example 3B), and a half octagonal face (example 3C), any alternate geometry operable to create the upper and lower well regions 212, 222 can be utilized. The particular shape of the faces of the fluid traps 270a, 270b, 270c determines the volume of lubricant/coolant that can be retained in the well regions 212, 222, and thus how long the gearbox 100 can continue to operate in the event of a power loss.

While the upper and lower portions 210, 220 are illustrated in FIGS. 3A-3C as distinct elements, in alternate examples the upper and lower portions 210, 220 can constitute a single element with a central opening.

In some operational states, the planetary gear 140 rotates fast enough to create what is referred to as a zero gravity effect. During a zero gravity effect, the lubricant/coolant can pool at a top portion 176 of the fluid traps 170a, 170b as well as the base portion 172. The top portion 176 is arranged similar to the base portion 172 and achieves the same effect. While the illustrated example of FIG. 2 includes fluid traps 170a, 170b on both the first axial end 154 and the second axial end 156, alternate examples can include only a single fluid trap for each of the planetary gears 140, with the single fluid trap being on either of the ends 154, 156.

While the above examples describe a gear system operable to receive and input from a shaft at a sun gear 120, and output rotation at a ring gear 130, it is understood that the reverse operation could similarly be facilitated by the gear system. In this alternate example, the ring gear 130 receives a rotational input, and the gear system provides a rotational output at the shaft connected to the sun gear. Furthermore, while the above described example utilizes a planetary gear to connect the ring gear 130 to the sun gear 120, one of skill in the art will understand that the above described passive mechanisms for temporarily providing lubricant/coolant fluid to the gearbox can be applied to any intermediate gear type system including star gear systems and other similar gear systems and is not limited to planetary gears.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fan drive gear system comprising:
at least one intermediate gear that includes an axial gear passage for receiving and conveying a fluid suitable for at least one of cooling and lubricating, the axial gear passage being in fluid communication with a gearbox;
a pin received in the axial gear passage;
at least one bearing element disposed between the pin and an interior surface of the axial gear passage;
a first axial end of said intermediate gear includes a first fluid storage trap in fluid communication with the axial gear passage to capture fluid entering and/or exiting the axial gear passage and to passively supply the fluid to the at least one bearing element during an interrupted power event, the first fluid trap being affixed to said carrier body via at least one of a seal and a bond such that said fluid does not leak between said first fluid storage trap and said carrier body;
a sun gear interfaced with said intermediate gear;
a ring gear interfaced with said intermediate gear; and
a carrier body supporting the intermediate gear.

2. The fan drive gear system of claim 1, wherein the first fluid storage trap comprises a radially outward base portion relative to an axis defined by said carrier body and at least one radially inward base portion relative to said axis defined by said carrier body.

3. The fan drive gear system of claim 1, further comprising a second fluid storage trap disposed at a second end of said intermediate gear, axially opposite the first end of the intermediate gear.

4. The fan drive gear system of claim 1, wherein said first fluid storage trap is a passive element.

5. The fan drive gear system of claim 1, wherein said first fluid storage trap is affixed to said carrier body via at least one of a welded bond and an adhesive bond.

6. The fan drive gear system of claim 1,
wherein the pin includes an axially aligned bore defining a radially inner pin surface, and the pin includes at least one through hole connecting the radially inner pin surface to a radially outer pin surface such that a fluid in said through hole is passed to an interior of said carrier body.

7. The fan drive gear system of claim 1, wherein the bearing element is a roller bearing.

8. A fan drive gear system comprising:
at least one intermediate gear that includes an axial gear passage for receiving and conveying a fluid suitable for at least one of cooling and lubricating, the axial gear passage being in fluid communication with a gearbox;
a pin received in the axial gear passage;
at least one bearing element disposed between the pin and an interior surface of the axial gear passage;
a first axial end of said intermediate gear includes a first fluid storage trap in fluid communication with the axial gear passage to capture the fluid entering and/or exiting the axial gear passage and to passively supply the fluid to the bearing element during an interrupted power event, wherein the first fluid storage trap comprises a radially outward base portion relative to an axis defined by said carrier body and at least one radially inward base portion relative to said axis defined by said carrier body, and said radially outward base portion is defined on a first axial end of the radially outward base portion by a radially aligned wall segment of said carrier body relative to the axis defined by the carrier body and said radially outward base portion is defined on a second axial end of the radially outward base portion by a radially aligned wall of said first fluid storage trap;
a sun gear interfaced with said intermediate gear;
a ring gear interfaced with said intermediate gear; and
a carrier body supporting the intermediate gear.

9. The fan drive gear system of claim 8, wherein said radially aligned wall of said first fluid storage trap extends further radially away from said axis defined by the carrier body than said radially aligned wall segment.

10. The fan drive gear system of claim 8, wherein
said at least one intermediate gear includes an axially aligned through hole having an opening at a first end and an opening at a second end opposite the first end; and
said radially aligned wall segment of said carrier body extends to an edge of said opening such that excess fluid in said first fluid storage trap spills from said first fluid storage trap into said at least one bearing element.

11. The fan drive gear system of claim 10, further comprising a powered fluid injection system disposed adjacent at least one opening of said axially aligned through hole such that fluid is injected into an interior of said pin.

\* \* \* \* \*